United States Patent

Boryta

[19]

[11] Patent Number: 6,143,260
[45] Date of Patent: Nov. 7, 2000

[54] METHOD FOR REMOVING MAGNESIUM FROM BRINE TO YIELD LITHIUM CARBONATE

[75] Inventor: Daniel A. Boryta, Cherryville, N.C.

[73] Assignee: Chemetall Foote Corporation, Kings Mountain, N.C.

[21] Appl. No.: 09/351,956

[22] Filed: Jul. 12, 1999

Related U.S. Application Data

[60] Provisional application No. 60/093,067, Jul. 16, 1998.

[51] Int. Cl.[7] .......................... C01D 15/00; C22B 26/20; C01F 1/00
[52] U.S. Cl. ...................... 423/179.5; 423/163; 423/164
[58] Field of Search ................. 423/179.5, 163, 423/164, 421

[56] References Cited

U.S. PATENT DOCUMENTS

| | | | |
|---|---|---|---|
| 3,268,289 | 8/1966 | Macey | 423/179.5 |
| 3,523,751 | 8/1970 | Burkert et al. | 423/179.5 |
| 4,124,684 | 11/1978 | Olivier et al. | |
| 4,261,960 | 4/1981 | Boryta | 423/179.5 |
| 5,219,550 | 6/1993 | Brown et al. | 423/179.5 |
| 5,939,038 | 8/1999 | Wilkomirsky | 423/157 |
| 5,993,759 | 11/1999 | Wilkomirsky | 423/179.5 |
| 6,048,507 | 4/2000 | Amouzegar et al. | 423/179.5 |

FOREIGN PATENT DOCUMENTS 9929624   6/1999   WIPO.

*Primary Examiner*—Steven Bos
*Attorney, Agent, or Firm*—Fulbright & Jaworski, LLP

[57] ABSTRACT

A method for producing lithium carbonate by precipitating magnesium as the hydroxide from a brine concentrated to a lithium concentration of about 6%. Lithium is then precipitated from the brine by addition of recycled limed mother liquor from a previous lithium precipitation step.

4 Claims, 2 Drawing Sheets

METHOD FOR REMOVING MAGNESIUM FROM BRINE TO YIELD LITHIUM CARBONATE

This applications claims the benefit of U.S. Provisional No. 60/093,067 filed Jul. 16, 1998.

BACKGROUND AND SUMMARY OF THE INVENTION

The present invention relates to a method of recovering lithium carbonate from brines by removing magnesium as magnesium hydroxide.

Lithium metal has many industrial uses including, e.g., employing a blanket of the liquid metal for breeding purposes in nuclear fusion reactors in the nuclear power industry. Additionally, lithium metal is used in lightweight, compact primary and secondary lithium batteries for military and commercial applications and as a degasifier in the production of high-conductivity copper and bronze. Another use of this metal is in the synthesis of organometallic compounds for applications in the fields of rubber, plastics and medicines. Lithium metal is generally produced for such uses by electrolysis of an eutectic mixture of highly pure molten lithium chloride and potassium chloride. Lithium carbonate also finds many applications, particularly in the pharmaceutical industry.

Naturally occurring brines found, e.g., in the United States and Chile, contain reasonable concentrations of lithium, in the form of lithium chloride. These brines are viable reserves for lithium recovery. These brines also contain varying amounts of boron, calcium and other components. Some typical components of naturally occurring brines are identified in the Table below (all values in weight percent):

report as contaminants. Simple technical means for their removal from the metal are not cost effective.

U.S. Pat. No. 4,261,960 discloses the removal of boron, as well as magnesium and sulfate, by treatment of the brine with an aqueous slurry of slaked lime and an aqueous solution of calcium chloride, followed by concentrating. In addition, it is known that magnesium can be removed from brine from the Salar de Atacama in Chile by concentrating the brine to contain approximately 4% lithium (hereinafter the 4% lithium process). The magnesium from this concentrated brine, e.g. concentrated to contain approximately 4.3% lithium and 3.5% magnesium, may be precipitated by raising the pH to 11 to yield magnesium hydroxide as a precipitate; however, the magnesium hydroxide forms a fine precipitate and is difficult to filter, rendering this process unsuitable for commercial practice.

In the 4% lithium brine, the magnesium to lithium weight ratio is about 0.83 (3.5% Mg, 4.2% Li). Magnesium, in the 4% lithium process, is partially removed as magnesium carbonate utilizing the carbonate ion present in the recycled spent brine. All the magnesium cannot be removed as the carbonate without precipitating lithium carbonate. Therefore, a second purification step is required whereby magnesium is precipitated as $Mg(OH)_2$.

In addition to controlling magnesium, calcium coming from the slaked lime must also be removed because calcium will report with magnesium directly to the lithium carbonate product. Recycling the mother liquor will remove up to 70% of the magnesium first as the carbonate. The remaining magnesium can then be removed by addition of a lime/soda ash reagent slurry. Thus, a two step process is required to remove magnesium from the 4% lithium brine. The two step process results in a greater yield of lithium than precipitating $Mg(OH)_2$ alone.

There is a need in the art for improved techniques allowing for improved yields of lithium carbonate.

|  | Ocean | Dead Sea Israel | Great Salt Lake Utah | Bonneville Brine Utah | Salton Sea Brine Calif | Silver Peak Brine Nevada | Salar de Atacama Brines Chile 1 | 2 |
|---|---|---|---|---|---|---|---|---|
| Na | 1.05 | 3.0 | 7.0 | 9.4 | 5.71 | 6.2 | 7.17 | 5.70 |
| K | 0.038 | 0.6 | 0.4 | 0.6 | 1.42 | 0.8 | 1.85 | 1.71 |
| Mg | 0.123 | 4.0 | 0.8 | 0.4 | 0.028 | 0.02 | 0.96 | 1.37 |
| Li | 0.0001 | 0.002 | 0.006 | 0.007 | 0.022 | 0.02 | 0.15 | 0.193 |
| Ca | 0.04 | 0.05 | 1.5 | 0.5 | 0.0 | 0.71 | 1.46 | 0.043 |
| Cl | 1.9 | 16.0 | 14.0 | 16.0 | 15.06 | 10.06 | 16.04 | 17.07 |
| Br | 0.0065 | 0.4 | 0.0 | 0.0 | 0.0 | 0.002 | 0.005 | 0.005 |
| B | 0.0004 | 0.003 | 0.007 | 0.007 | 0.039 | 0.005 | 0.04 | 0.04 |
| Li/Mg | 0.0008 | 0.0005 | 0.0075 | 0.0175 | 0.786 | 1.0 | 0.156 | 0.141 |
| Li/K | 0.0026 | 0.0033 | 0.015 | 0.0049 | 0.0155 | 0.016 | 0.081 | 0.113 |
| Li/Ca | 0.0025 | 0.0064 | 0.2 | 0.0583 | 0.0008 | 1.0 | 4.84 | 0.244 |
| Li/B | 0.25 | 0.6666 | 0.857 | 1.0 | 0.051 | 4.0 | 3.75 | 4.83 |

Some of these brines have high concentrations of lithium and a low magnesium to lithium ratio, generally about 1:1 to 6:1, which allow for a simplified process of concentrating, purifying and recovering lithium chloride brine. Lithium carbonate is then obtained by treatment of the brine with soda ash.

The impurities, such as, magnesium, calcium, sodium, sulfate and boron present in lithium containing natural brines, should be minimized to produce a lithium carbonate product suitable for its intended use. Alkali and alkaline earth metals, such as sodium, calcium, and especially magnesium must be substantially removed, otherwise, they will The present invention addresses the aforementioned difficulties with prior art techniques by providing a simplified single step process for removing magnesium in a single step from brine saturated with respect to lithium and magnesium while recovering lithium carbonate from the brine. Mother liquor from the lithium carbonate precipitation reaction is recycled and reacted with brine to produce calcium carbonate and base to precipitate the magnesium hydroxide. A reagent of slaked lime and soda ash is then added to adjust the final pH prior to filtering the magnesium hydroxide and calcium carbonate solids. The lithium is then precipitated from the purified brine as lithium carbonate.

It is important to maintain the pH between 8.40 to 8.80, preferably between 8.55 and 8.75, during the magnesium hydroxide precipitation, i.e., when the limed mother liquor is mixed with brine.

The single step 6% lithium brine process of the present invention uses a single purification step whereby the magnesium in the plant feed brine is precipitated as $Mg(OH)_2$. The process results in greater yields of lithium carbonate than the aforementioned process.

The process of the present invention is described in more detail below.

DETAILED DESCRIPTION OF THE INVENTION

Figure 1:
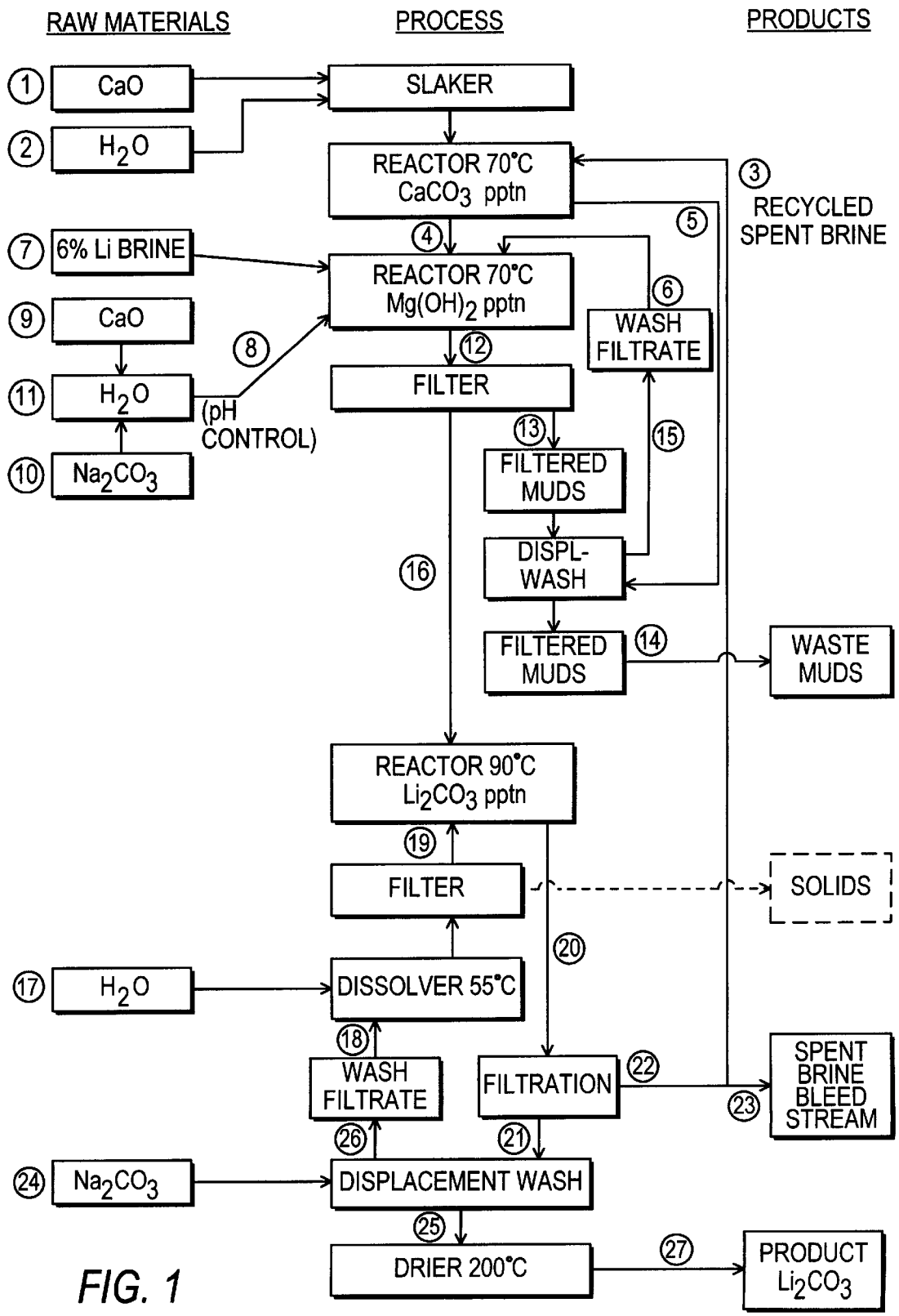
FIG. 1 is a flow diagram of a process of the invention.

To begin the process, brine containing lithium ions and magnesium ions is concentrated to be saturated with magnesium and lithium chlorides to a lithium content of about 5.5% to about 6.5%, preferably from about 6.0% to about 6.2%. Preferably, a natural Chilean brine is concentrated e.g., via solar evaporation, to a lithium content of about 6.2%. This concentration results in approximately four-fold reduction (compared to the original brine content) of magnesium concentration relative to lithium concentration, reducing the magnesium to lithium weight ratio from 0.82:1 in the starting 4% Li brine to 0.24:1 in 6% Li brine.

Concentration yields the double salt precipitated as lithium magnesium chloride heptahydrate ($LiCl.MgCl_2.7H_2O$) double salt, which begins to precipitate once the lithium is concentrated to about 4%. The lithium in these salts is recovered, e.g., by slurrying and washing the salts with a brine saturated with magnesium chloride but not saturated with respect to lithium chloride salts to yield bischofite ($MgCl_2.6H_2O$), which may be recovered, e.g., by centrifugation, filtration or by draining. The overall yield of lithium as 6% lithium brine is 97% when the lithium values from the double salt are reclaimed. The 3% loss of lithium, associated with additional bischofite, produced is compensated for by the improved lithium carbonate yield using the single step 6% Li brine process.

The magnesium remaining in the brine can then be removed as magnesium hydroxide hexahydrate ($Mg(OH)_2.6H_2O$) by addition of lime, e.g., limed mother liquor from a previous lithium carbonate precipitation step. This is accomplished by diluting the 6% lithium brine to a lithium concentration of 1% by addition of limed lithium carbonate precipitation mother liquor. The dilution with the limed mother liquor precipitates magnesium hydroxide hexahydrate and the calcium in the lime reacts with available carbonate ion in the mother liquor and is precipitated as $CaCO_3$.

The pH should be maintained between 8.40 and 8.80, preferably 8.55 to 8.75, and most preferably 8.60 when adding the lime treated mother liquor to the feed brine. The pH is preferably adjusted to 8.70 to 9.10, preferably to 8.90, just prior to filtration of the $Mg(OH)_2$ salt. A lime water displacement wash on the filter cake is effective to remove lithium from the magnesium hydroxide/calcium carbonate solids.

Precipitation of magnesium hydroxide can also be accomplished by first mixing the mother liquor with the 6% lithium brine and then adding the lime, but the former process is preferred because it results in a greater lithium carbonate yield because the co-precipitated calcium carbonate acts as a filter aid.

In a preferred embodiment, lime is first added to the mother liquor which essentially generates a hydroxide solution containing precipitated calcium carbonate. The lowered carbonate concentration prevents precipitation and entrapment of lithium during the magnesium hydroxide precipitation step which follows. Magnesium hydroxide is then precipitated by simultaneous addition of the causticized mother liquor which contains approximately 0.5 to 0.9% carbonate ions and the 6.2% lithium brine to opposite sides of a continuously stirred reactor. This can be accomplished as a batch or continuous operation.

A preferred procedure found for reclaiming lithium from the $Mg(OH)_2$—$CaCO_3$ muds is to give the muds a displacement wash using limed spent brine. Limed water is also effective; but adds a water burden to the process and dilute the process streams. The use of limed recycled spent brine to wash the muds is effective in helping to remove some of the sodium, chloride, and water from the process. The mud wash filtrate must be recycled to the $Mg(OH)_2$ reactor to prevent Li concentration in the purification step from exceeding 1% Li and subsequently precipitating additional Li as $Li_2CO_3$ with the muds. Recycle of the mud wash filtrate improves lime utilization and can be used as a heel in a batch type operation. The magnesium hydroxide mud wash filtrate can then be recycled as the heel for the magnesium hydroxide precipitation step.

The filtration rate of these muds is sensitive to pH during simultaneous addition of limed recycled spent brine and concentrated feed brine. During this step, the pH should be controlled between about 8.55 and about 8.75 in order to produce a mud that can be easily filtered, e.g. using a vacuum drum filter designed for removing $MgCO_3$ in the 4% Li two step process. Operation at a pH above or below this range significantly reduces the filtration rate, lithium yield, and process viability.

The resultant purified brine has a lithium content of about 0.6 to about 1.5%, preferably about 1%. Lithium carbonate is then recovered by addition of soda ash to the purified brine. Preferably the brine is about 50 to 95° C., preferably 90° C. for precipitation of the $LiCO_3$. The spent brine now has a lithium content of approximately 0.12%. Lower temperatures will improve some of the physical properties of the lithium carbonate solids, e.g. bulk or free fall density, at the sacrifice of yield due to the reverse solubility of lithium carbonate in water.

A 26% soda ash solution is used to precipitate $Li_2CO_3$ from purified brine. This solution can be prepared using product wash filtrate, and filtered to remove insolubles. Lithium carbonate will not precipitate provided that the wash filtrate does not exceed 0.18% Li. The precipitation of lithium carbonate from a lithium chloride brine is represented by Reaction (1).

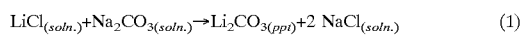

$$LiCl_{(soln.)} + Na_2CO_{3(soln.)} \rightarrow Li_2CO_{3(ppt)} + 2\ NaCl_{(soln.)} \qquad (1)$$

It is necessary to bleed sodium, chloride, and water from the recycled mother liquor to maintain performance of the system. This can be accomplished by means known in the art.

Boron may be removed according to the process described in U.S. Pat. No. 5,219,550.

Product produced during the recycle tests had the following average assay:

| Li$_2$CO$_3$ Crystal | |
| --- | --- |
| Assay | 99.59 |
| Cl | 0.008 |
| SO$_4$ | .01 |
| Ca | 0.03 |
| Mg | 0.007 |
| Na | 0.058 |
| B | 0.03 |
| Wt. Loss at 550° C. | 0.40 |

To precipitate the lithium carbonate, soda ash was added to the purified brine (after the magnesium hydroxide precipitation step) at 90° C. to precipitate a Li$_2$CO$_3$ product and produce a spent brine recycle stream containing 0.12% Li. The amount of soda ash to be added was calculated as follows:

Wt. Na$_2$CO$_3$=(Wt. % Na$_2$CO$_3$)×(Wt. of purified brine)

Wt. % Na$_2$CO$_3$=[(Wt. % Li in purified brine)−(Wt. % Li in spent brine)]×7.636+[(X$_{SP}$Li$_2$CO$_3$)÷(Wt. % Li in spent brine)$^2$]× 1.767

Wt. % Li in spent brine=0.12

The solubility product used for Li$_2$CO$_3$ (K$_{SP}$Li$_2$CO$_3$) is in (wt. %)$^3$ units and is dependent upon the sodium concentration (Ref. 2) according to the following relationship:

K$_S$P Li$_2$CO$_3$=(Wt. % Li)$^2$ (Wt. % CO$_3$)=0.0299−(0.00219×Wt. % Na)

In a preferred embodiment, the lithium carbonate precipitation step is preferably conducted by adding 40% of the purified brine simultaneously to all of the soda ash solution over a 30-minute period at 90° C. This slurry is then added simultaneously to the remaining purified brine over a 45-minute period followed by stirring for another 30 minutes and filtering.

A bleed stream is provided to remove unwanted sodium, chloride from the spent brine before recycling. The volume of the process bleed stream is sufficient to remove sodium, chloride, and water so that these impurities do not build up in the process. Assuming that the process bleed stream will contain 8.4% Na (21.5% NaCl), this stream will amount to about 8.8 lbs. per pound product and account for a lithium loss of about 5.6% of the input lithium in the spent brine (0.12%).

Figure 2:
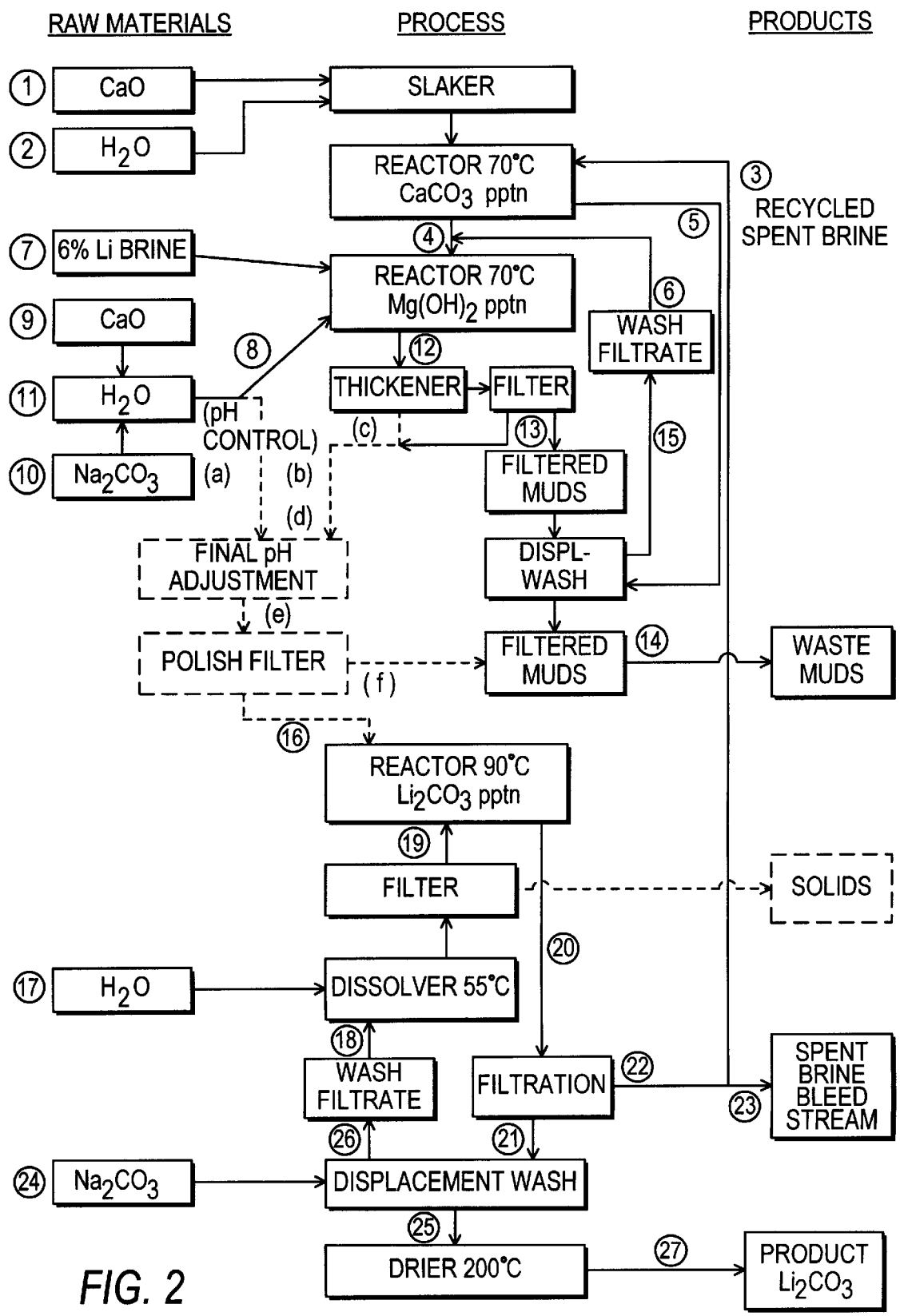
FIG. 2 is a flow diagram of an alternative process of the present invention.

To better understand the invention, the following description refers to the flow processes shown in FIGS. 1 and 2. The weight of spent brine 3 needed to dilute concentrated 6% Li feed brine 7 to 1.0% Li is calculated. The weight percent of CO$_3$ concentration in the recycled spent brine 3 generated from the previous recycle test. is determined by weighing a 10.0 g. sample and titrating for CO$_3$ using N/10 HCl between pH 7.4 and 4.4.

The weight of lime 1 required to react stoichiometrically with CO$_3$ in recycled spent brine 3 is calculated as follows:

wt. CO$_3$×CaO/CO$_3$×% lime activity=wt. CaO.

The lime is slaked with 6–7 parts water 2 to one part lime 1 and added to recycled spent brine 3 and stirred.

The slaked lime is added to the recycled spent brine stream stoichiometrically to the carbonate ion present according to Reaction (2).

Na$_2$CO$_{3(soln.)}$+Ca(OH)$_{2(slaked lime)}$→CaCO$_{3(ppt)}$+2NaOH$_{(soln.)}$ (2)

The carbonate concentration in the recycled spent brine must be controlled so that it does not exceed the equivalent amount of total lime needed to precipitate the magnesium from plant feed brine. This is controlled by the amount of excess soda ash used to precipitate lithium carbonate.

Separately, the caustic slurry 8 is prepared for pH control, if necessary. This caustic slurry 8 is prepared by adding lime 9 (CaO×lime activity) stoichiometrically to 26% soda ash solution 10 and 11 prepared using product wash filtrate 18 and/or water 11. The caustic slurry 8 is stirred for 30–60 minutes prior to use and continue stirring thereafter until depleted.

Magnesium hydroxide muds 13 are washed with limed recycled spent brine 5. The mud wash filtrate 15 is saved and used in the next recycle test as a heel for the Mg(OH)$_2$ precipitation step.

The magnesium present in the concentrated feed brine 7 is precipitated as magnesium hydroxide by simultaneously adding the feed brine to limed spent brine 4 at opposite sides of a reactor. Caustic slurry 8 is added to maintain the pH at 8.6. It is preferred that the limed spent brine is added at a temperature of 70° C., and that the concentrated feed brine is at ambient temperatures. The caustic slurry should also be at ambient temperature. A final pH adjustment may be made at the end if needed. The pH tends to slowly rise in the final 15–30 minute period of the process, but the final pH should be a minimum of 8.9 for effective magnesium removal.

At this point, the sample may be filtered for calcium. If the calcium concentration is greater than 25 ppm, stoichiometric amounts of soda ash solution may be added to the calcium present in the solution phase of the reactor slurry.

The magnesium hydroxide precipitate may be recovered via a vacuum filtration of the Mg(OH)$_2$ reaction slurry 12 at 70° C. The Mg(OH)$_2$ 13 cake is washed with limed recycled spent brine 5 using a displacement wash, and the mud filtrate 15 is recycled as above.

Addition of limed spent brine to feed brine precipitates Mg(OH)$_2$ according to Reaction (3).

2NaOH$_{(soln.)}$+MgCl$_{2(soln.)}$→Mg(OH)$_{2(ppt)}$+2NaCl$_{(soln.)}$ (3)

Stoichiometric addition of calcium on a weight basis to the CO$_3$ present in recycled spent brine and for preparation of the lime-soda ash reagent for pH control is sufficient for controlling calcium.

FIG. 2 sets forth an alternative embodiment of the invention for a continuous Mg(OH)$_2$ precipitation method. The Mg(OH)$_2$ is continuously precipitated by simultaneous addition of feed brine 7 and limed spent brine 4 containing recycled wash filtrate while maintaining the pH at 8.6 by addition of caustic slurry 8. The muds are allowed to settle, and the brine is decanted (stream (c)) and the wash muds filtered as above. The decantate (c) is adjusted to a minimum of pH 8.9 using the lime soda ash slurry shown in FIG. 2 as (a) composed of lime (b) and soda ash (d). The purified brine (e) is then polish filtered. The muds from the polish filter are not washed and are shown in FIG. 2 as (f).

To precipitate lithium carbonate from the purified brine 16, the lithium concentration of the purified brine is determined, e.g., using the atomic absorption method. The amount of soda ash required to precipitate Li$_2$CO$_3$ and to produce a spent brine containing a specified lithium and carbonate concentration is calculated; e.g., 0.12% Li and 0.70% CO$_3$.

$Na_2CO_3$ 17 is dissolved in the recycled $Li_2CO_3$ wash filtrate 18 at 55–60° C. (26–27% by weight soda ash in wash filtrate). Simultaneously, 40% of the purified brine 16 is added with all the soda ash solution 19 at opposite sides of the reactor at 90° C. with stirring over a 30-minute period. The above mixture is then added simultaneously to the remaining purified brine 16 over another 30-minute period followed by 30 minutes of additional stirring at 90° C.

The $Li_2CO_3$ is recovered, e.g. via vacuum filtration of the slurry at 90° C. under a blanket of steam to prevent evaporation of spent brine on the product surface and in the filter substrate.

Filter cake 21 is then washed with three displacement washes using a total of 4 to 5 lbs. water 24 per lb. dried product 27. The wash filtrate 26 is returned to the soda ash dissolver 18 and excess used to prepare the lime soda ash reagent 8. The product is then dried, e.g. by allowing to dry overnight at a temperature of 190° C.

Based on the stoichiometry according to the reactions shown above, it is preferred that the carbonate concentration does not exceed 0.96% $CO_3$. Exceeding this stoichiometry will have adverse effects and excess lime will be required to prevent lithium carbonate from precipitating during purification. Controlling pH during simultaneous addition will also be difficult and will have an adverse effect on the filtration characteristics of the purification muds; and the excess carbonate will increase the carbonate loss to the bleed stream and increase soda ash requirements.

It is preferred that the $CO_3$ concentration in the spent brine is between 0.6 and 0.8% $CO_2$. The average $CO_3/(Mg)$ mole ratio for the $CO_3$ in unlimited recycle spent brine and magnesium in concentrated feed brine is preferably about 0.73.

The filtration rate of purification muds containing $Mg(OH)_2$ and $CaCO_3$ is affected by the pH at which the muds are precipitated and addition time. It has been found that the optimum pH range for maximum filtration is between 8.55 and 8.75; a pH above or below this range will cause the muds to have poor filtration characteristics. A preferred reagent used to control pH is composed of 22% $Na_2CO_3$, 13% CaO and 65% filterwash water ($Li_2CO_3$). Apparently, reaction (2) is slow and goes to completion after addition for pH control. For this reason, it is preferred that, to maintain consistency, the reagent is constantly stirred after preparation until consumed.

The average amount of concentrated brine, soda ash, lime, and fresh water required per pound product for the single step 6% Li, the 4% double step Li brine process and the 4% double step performed on 6% Li brine are as follows:

| Raw Material | Raw Material Requirement, Lbs./Lb. $Li_2CO_3$ Recycle Series | | |
|---|---|---|---|
| | Single step 6% Li brine process of the invention | 4% Li Double step process | 4% Double step process on 6% Li brine |
| Feed brine | 3.25 (6.05% Li) | 5.02 (4.19% Li) | 3.59 (6.19% Li) |
| Total Water | 6.51 | 7.68 | 6.51 |
| CaO (92% active) | 0.21 | 0.17 | 0.14 |
| $Na_2CO_3$ | 1.88 | 2.47 | 1.99 |
| Process yield (loss basis) | 92.48 | 85.44 | 84.15 |
| Product yield (prod. basis) | 94.13 | 86.89 | 84.22 |

The data show improved lithium yields for the single step 6% lithium process compared to either of the other two double step processes.

In order to control pH during simultaneous addition, the recommended recycled spent brine $CO_3$ concentration is between 0.6 and 0.8% $CO_3$.

Reagent for controlling pH during simultaneous addition is composed of lime slaked with a stoichiometric amount of 26% soda ash solution. The amount of calcium in lime is based upon lime activity. A weighing method can be used to prepare the reagent.

The maximum magnesium and calcium concentration allowable in purified brine for producing an acceptable product is less than 3 ppm Mg and less than 24 ppm Ca. A minimum pH of 8.9 before polish filtering the purified brine is required to reduce magnesium to acceptable levels. A simple titration technique can be used to estimate the $Ca/CO_3$ balance in process brines and for determining if more carbonate needs to be added as sodium carbonate for maintaining calcium below the allowed limit.

A 26–28% soda ash solution can be prepared using product wash filtrate without precipitating lithium carbonate provided that the Li in the wash filtrate does not exceed 0.18% Li.

Other facets of the invention will be clear to the skilled artisan, and need not be set out here. The terms and expression which have been employed are used as terms of description and not of limitation, and there is no intention in the use of such terms and expression of excluding any equivalents of the features shown and described or portions thereof, it being recognized that various modifications are possible within the scope of the invention.

It is claimed:

1. A process for recovering lithium carbonate from a brine containing lithium and magnesium comprising:

(a) preparing a feed brine by concentrating a brine comprising lithium and magnesium ions to saturate the brine with magnesium chloride and lithium chloride and to precipitate $LiCl.MgCl_2.7H_2O$;

(b) adding $Ca(OH)_2$ to the mother liquor recycled from step (e) to yield limed mother liquor;

(c) mixing the limed mother liquor with said feed brine while maintaining a pH of from 8.40 to 8.80 to precipitate the magnesium ions as magnesium hydroxide and to precipitate calcium carbonate, (d) recovering the brine from step (c) and adding a sufficient amount of sodium carbonate to precipitate lithium carbonate;

(e) separating the precipitated lithium carbonate from the mother liquor; and (f) recycling the mother liquor produced in step (e) to step (b).

2. The process of claim 1, wherein the concentration of lithium ion in the feed brine is from about 5.5 to about 6.5% by wt.

3. The process of claim 1, wherein the $LiCl.MgCl_2.7H_2O$ is recovered and processed to recover the lithium contained therein.

4. The process of claim 1, wherein the pH in step (c) is between 8.55 and 8.75.

* * * * *